Figure 1:
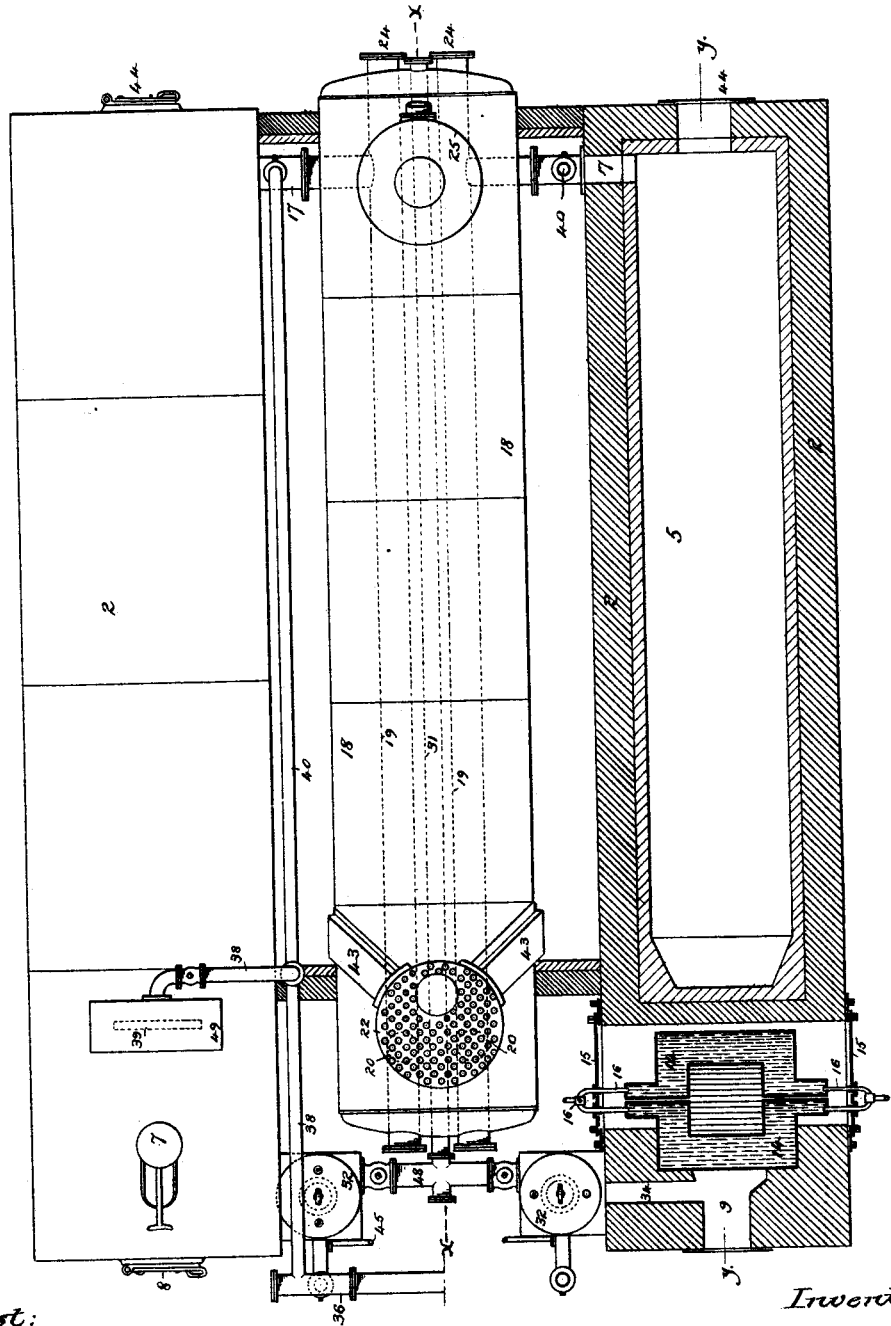

(No Model.) 4 Sheets—Sheet 2.

G. S. DWIGHT, Dec'd.
M. T. Dwight, Administratrix.
APPARATUS FOR MANUFACTURING WATER GAS.

No. 388,849. Patented Sept. 4, 1888.

Attest:
Geo. H. Graham
A. F. Jasbera

Inventor,
George S. Dwight,
by Munson & Philipp
Attys.

(No Model.) 4 Sheets—Sheet 3.

G. S. DWIGHT, Dec'd.
M. T. Dwight, Administratrix.
APPARATUS FOR MANUFACTURING WATER GAS.

No. 388,849. Patented Sept. 4, 1888.

Attest:
Geo. H. Graham
A. N. Jasbera

Inventor,
George S. Dwight,
by Hunton & Philipp.
Attys.

(No Model.) 4 Sheets—Sheet 4.

G. S. DWIGHT, Dec'd.
M. T. Dwight, Administratrix.
APPARATUS FOR MANUFACTURING WATER GAS.

No. 388,849. Patented Sept. 4, 1888.

UNITED STATES PATENT OFFICE.

GEORGE SPRING DWIGHT, OF HAMBURG, GERMANY; MARY TORREY DWIGHT ADMINISTRATRIX OF SAID GEORGE SPRING DWIGHT, DECEASED.

APPARATUS FOR MANUFACTURING WATER-GAS.

SPECIFICATION forming part of Letters Patent No. 388,849, dated September 4, 1888.

Application filed October 30, 1882. Serial No. 75,462. (No model.) Patented in England April 22, 1882, No. 1,918, and in Germany November 15, 1882, No. 19,987.

*To all whom it may concern:*

Be it known that I, GEORGE SPRING DWIGHT, a citizen of the United States, residing in the city of Hamburg, Germany, have invented certain new and useful Improvements in Apparatus for Manufacturing Water-Gas, (said invention being embraced in English Letters Patent No. 1,918, dated April 22, 1882, and German Letters Patent No. 19,987, dated November 15, 1882,) fully described and represented in the following specification and the accompanying drawings, forming a part of the same.

The present invention relates to that class of furnaces which are used in the production of what is known as "water-gas," according to the process described in Letters Patent No. 197,062 to M. H. Strong.

I have discovered that with the high velocities involved in the rapid generation of the gas and the refractory nature of the fire-brick it is difficult to absorb all the heat of combustion in the regenerative chamber, especially if the carbon is burned to carbonic oxide in the combustion or coal chamber and then burned to carbonic acid in the regenerative chamber, the consequence being that the products of combustion escape from the furnace while still at a comparatively high temperature, while economy demands that this heat should be retained and utilized. To obviate this difficulty I lead all the gaseous products of the furnace through the pipes of a boiler especially constructed for the purpose, and wherein there may also be burned, if need be, some of the combustible products of the furnace, the steam thus generated from the water in the boiler being afterward used in the production of gas, as will hereinafter be more fully explained.

In using fuels containing much ash a grate is desirable to sift the same out of the fire-chamber; but if a grate is employed in the ordinary manner—that is to say, with the air-blast and hot gases passing alternately through it—it is soon burned out, while on the other hand if a hydraulic grate is used it chills the slag descending through it, in consequence of which the spaces between its bars soon become choked up, greatly impairing its operation. To obviate this difficulty I have so constructed the combustion-chamber that the blast of air enters the coal above the grate, so that the latter is not exposed to a high temperature, while to protect the edges of the brick-work at the point above the grate where the combustion is most intense I place a water-ring which can be put in position or removed without taking the furnace apart or disturbing the mason-work to any extent.

Figure 2:
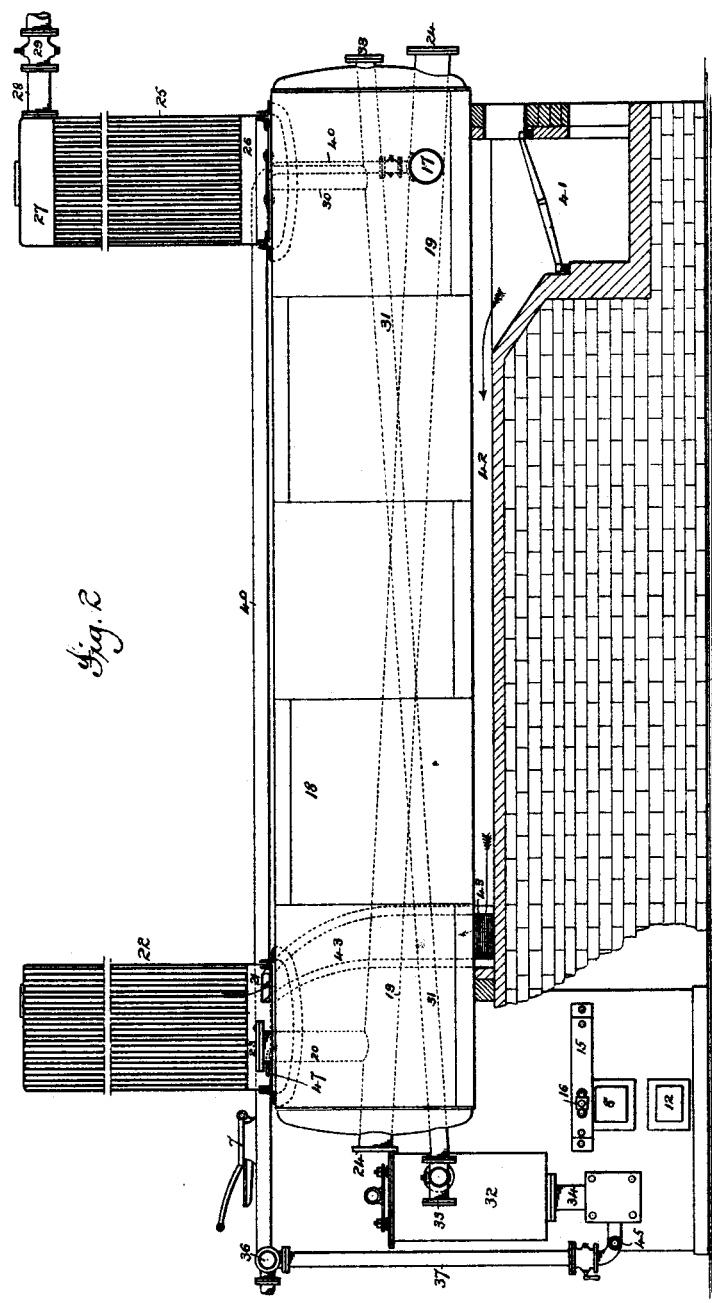
Figure 3:
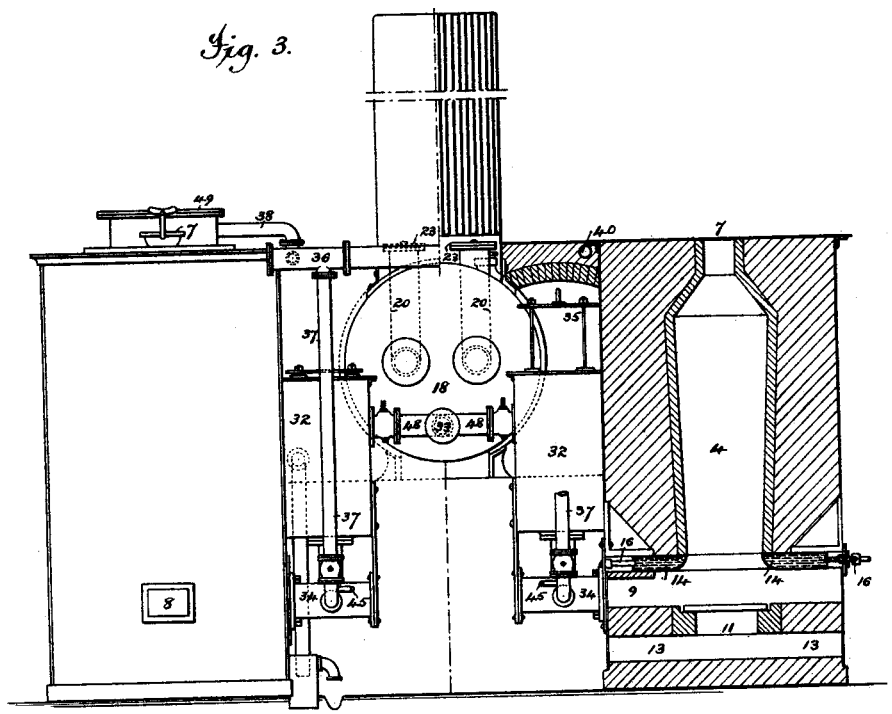
Figure 6:
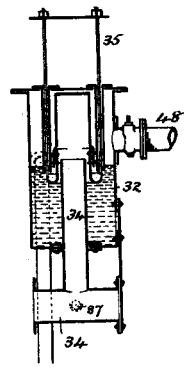
Figure 4:
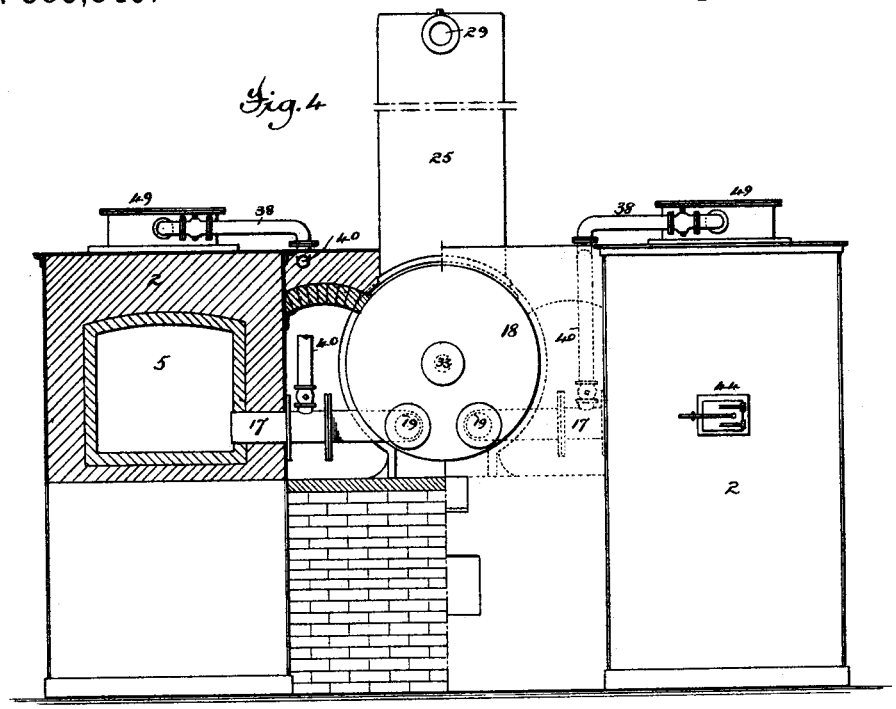
Figure 5:
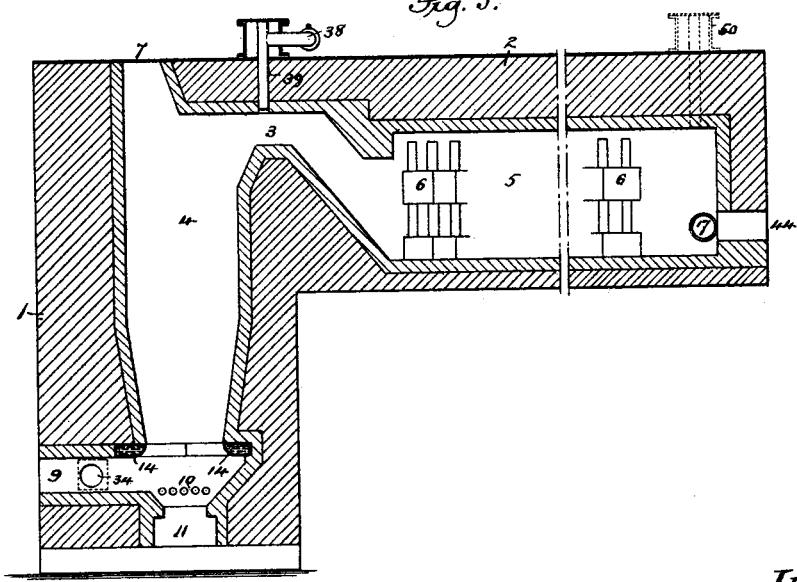

In the accompanying drawings, which illustrate a double or continuously acting furnace embodying the present invention in one of its forms, Figure 1 is a plan view, showing, however, one of the furnaces and its regenerative chamber in horizontal section. Fig. 2 is a longitudinal vertical section of the same, taken on the line $x\ x$ of Fig. 1. Fig. 3 is a front elevation of the same, showing but one of the furnaces in cross section. Fig. 4 is a rear elevation of the same, but showing one of the regenerative chambers in cross-section. Fig. 5 is a longitudinal vertical section taken upon the line $y\ y$ of Fig. 1; and Fig. 6 is a detail showing the water-seal, to be hereinafter referred to.

As just stated, I have in the drawings represented a double furnace consisting of two generators—one located upon each side of the boiler—which construction renders the operation of gas-making practically continuous, air being blown into one furnace while steam is being blown into the other, and vice versa, by which means the operation of the boiler and the supply of steam are rendered regular and constant.

It is of course to be understood that a single furnace having only one generator can be constructed upon the same plan and made to embody the present invention.

In the following description only one furnace will be referred to, as the two are exact duplicates.

The furnace consists, essentially, of a generator, 1, and a regenerator, 2, both of which are substantially built of fire-brick, the whole being inclosed in an iron shell or casing made steam-tight in all its parts and connections. The generator contains the vertical combustion-chamber 4, wherein the fuel is burned with air or steam in the usual manner, and the regenerator contains the horizontal regenerative chamber 5, which is filled in the usual manner with the loosely-arranged fire-bricks 6, these chambers being arranged so as to communicate directly with each other through the passage 3, which leads from the end of the latter to a point near the top of the former. The vertical and horizontal relationship of these chambers may be changed or varied without departing from the invention. The combustion-chamber is provided at its top with a charging-hole, 7, provided with any convenient form of cover or lid, for receiving the fuel, and at its bottom with three stoking-doors, 8, for giving access to the burning fuel through the passages 9, which open into said combustion-chamber at a point above its grate 10. Below the grate is located the ash-pit 11, to which access is gained through the doors 12 and passages 13. The brick walls of the generator at the point of the intersection of the passages 9 and the combustion-chamber are protected from the destructive influence of the fire by the hydraulic ring 14, through which water is constantly passing. This ring is made in two parts or segments, which can be put in place or removed without interfering with the solid walls of the combustion-chamber, and are supported externally by means of the removable plates 15. These two parts are connected with each other and with the boiler or other source of water-supply by means of the pipes 16, so that a regular flow of water can be maintained through them and the heat of the water can be economically utilized.

From the end of the regenerative chamber 5 a pipe, 17, leads directly into the boiler 18 and connects with a pipe, 19, which traverses the entire length of the boiler, and is provided with a vertical branch, 20, which terminates in the space 21 beneath the tubular water-heater 22, its end being provided with a sliding cover, 23. The pipes 19, of which there are two, one for each furnace, extend through the ends of the boiler and are provided with removable covers 24, through which they can be cleaned when necessary. These covers may be made of india-rubber backed with asbestus paper, so that in the event of any detonation arising from a careless mixture of the air and combustible gases they will blow off without any injury to the apparatus.

At the end of the boiler opposite to the tubular water-heater 22 there is located a second tubular water-heater, 25 beneath which is a space, 26 and above which is a space, 27, from which latter leads an outlet-pipe, 28, controlled by a valve, 29. The space 26 beneath the water-heater 25 is connected by means of a pipe, 30, with the pipe 31, which traverses the entire length of the boiler and connects with the hydraulic main or valve 32. The pipe 31, like the pipes 19, is accessible for cleaning by means of removable covers 33, located outside of the ends of the boiler. The hydraulic main or valve 32 is connected with the base of the generator by the pipe and passage 34, and is provided with a changeable water seal or valve, 35, working vertically therein. The main blast-pipe 36, which receives air from any suitable fan or blower, is provided with a branch, 37, through which air is conducted into the base of the generator by means of the pipe and pipe and passage 34. It also has another branch, 38, through which air is conducted to the opening 39 above the passage 3. It is also provided with a third branch, 40, through which air is supplied to the pipe 17.

A fire-space, 41, is provided beneath the end of the boiler, so that, if need be, coal or gas may be burned to increase the heat of the water contained therein. From this fire-space there leads a flue or passage, 42, through which the products of combustion may pass into the flue 43 to be thence conveyed to the opening 21, after which they will pass through the heater 22 to the open air.

The rear end of the regenerator is provided with a door, 44, through which access can be had to the regenerative chamber 5, for the purpose of cleaning the same when needed.

A steam-pipe, 47, provided with a cock (not shown) leads from the boiler to the pipe 20, and a second steam-pipe, 45, leads from the boiler to the pipe 37 at a point near its union with pipe 34. (See Fig. 2.)

The method of operating this furnace is as follows: The fire is kindled in the grate 10, all the openings being shut except the doors into the ash-pit and the door 44 at the end of the regenerator. When the furnace has become somewhat warm, the depth of fuel in the combustion-chamber can be increased. All the openings in the furnace will then be closed, and the cover 23 will be removed from the pipe 20. Air will then be driven in by the pipe 37 through the pipe and passage 34 to the fire above the grate. This air, passing upward through the coal, will go over into the regenerative chamber in the form of hot gases, which, during their passage through the loose bricks therein, will deposit their sensible heat, together with heavy vapors and atomic carbon. A considerable percentage of combustible gas (carbonic oxide) will still remain unconsumed when the gases arrive at the end of the regenerative chamber and pass into the pipe 17, and this is utilized by igniting it with a second blast of air sent into the pipe 17 through pipe 40. This causes combustion to ensue in the pipe 19, which, traversing the boiler beneath the surface of the water therein, imparts its heat to the water, and the resulting gases, now entirely non-combustible, pass through the pipe 20 into the space 21, rise thence through the tubes of the heater 22, parting with their remaining sensible heat to the water surrounding said tubes, and thence escape at a low temperature into the open air.

When sufficient heat is obtained in the furnace and sufficient steam in the boiler, both blasts of air are shut off. Enough steam is let in by the pipe 45 to expel the products of combustion remaining in the furnace and the boiler-pipe 19. The cover 23 is closed and the hydraulic valve 35 is opened by raising. Steam is then admitted through the pipe 47 into the pipe 20, which, passing through the pipe 19, enters the regenerative chamber through the pipe 17, and, passing through the hot bricks, becomes highly superheated. It then enters the generator through the passage 3, where it comes in contact with the glowing coals, upon which a mutual decomposition of carbon and steam occurs, forming what is popularly known as "water-gas." The gas thus formed escapes from the base of the generator through the pipe and passage 34 into and through the hydraulic main and the pipe 48, thence passing through the boiler by means of the pipe 31. In passing through the boiler it imparts its heat to the water therein, and finally issues through pipe 30 into the space 26 below the water-heater 25. From this space it rises upward through the tubes of the heater, yielding most of the remaining heat to the water therein, and finally passes out through the space 27 and pipe 28 at a low temperature to the holder or place of use. After a sufficient run of gas has been made, the steam is shut off from the pipe 47, the hydraulic valve 35 is closed, the cover 23 is removed from over the pipe 20, sufficient steam is admitted at 45 to explode the combustible gases remaining in the generator, coal is added, if required, at 7, any necessary stoking is done through the various doors, and the process before explained is repeated.

If in the process it is desired to utilize tars, fluid, or granulated hydrocarbons, such materials can be best introduced at 39 by such device as may be suited to the peculiarities of the substances used. As these vary with the materials, no special device is shown in the drawings for this purpose. The passage 39 is simply covered by a plate, 49. This can be removed to give place to any device adapted to the material which it is desired to inject at that point. I have discovered, however, that many of these materials have a tendency to burn to a species of coke (if converted by superheated steam) in the passage 39, which therefore becomes obstructed, and I therefore introduce at the proper time air into this passage by means of the blast-pipe 38, by which an active combustion ensues and the passage is kept free. A novel use may be made of such liquid or granulated forms of fuel when it is desired to economize the fuel on the grate, as follows: After the furnace has become somewhat heated in the part of the regenerator nearest the combustion-chamber and is being driven with air, the blast may be entirely or in part shut off at the pipe 37, so that little or no air shall pass through the coal in the combustion-chamber, and the blast at 38 being opened, air is driven in through 39, and the fluid or granulated fuel is simultaneously fed into the passage 3, which, mingling together with the air, burns actively in the regenerative chamber 5, any combustible gases passing out of the regenerator being burned in the pipe 19 by the blast from the pipe 40, as before described. A considerable portion of the fuel thus carried out into the regenerative chamber remains unconverted or partially converted, and being distributed in a finely-divided form among the devices in the regenerative chamber and at a high temperature, it is in a most favorable condition possible for a very rapid decomposition with the steam subsequently admitted. Any ashes remaining in the regenerator can be removed by a blast of air forced through the door 44.

In some instances, when the regenerator has become sufficiently heated by any of the methods before described, water-gas may be economically generated by injecting pulverized or liquid fuel into the regenerator at 50 simultaneously with the entrance of steam through the pipe 17. The dust or vaporized fuel, passing together among the hot bricks of the regenerator, reach the heat of decomposition and are converted, the resulting gases passing out through the generator, as before described. The radiating heat from one side of each regenerator acts upon the boiler, and if further heat beyond that supplied from the products of combustion and the gas in passing through the pipes of the boiler is required in getting up or maintaining steam it can be supplied by either a coal or gas fire beneath the boiler at 41.

What I claim is—

1. The combination, with the generator consisting of the chamber in which the fuel is burned, and the regenerator consisting of the chamber containing the refractory material, of the boiler provided with the pipe 19, the pipe 17, connecting the pipe 19 and the regenerator, and the air-blast pipe 40 for admitting a blast of air to the pipes 17 and 19, substantially as described.

2. The combination, with the generator and regenerator, of the boiler provided with the pipe 19, extending through the boiler and communicating with the regenerator and having the removable covers 24, and the branch 20, communicating with said pipe 19 and with the water-heater 22, and having the removable cover 23, substantially as described.

3. The combination, with the generator and regenerator and the boiler 18, of the pipe 19, extending the length of the boiler 18, the pipe 17, communicating with said pipe 19 and the regenerator, the tubular water-heater 22, and the pipe 20, communicating with said pipe 19 and said water-heater, substantially as described.

4. The combination, with the generator consisting of the chamber in which the fuel is burned, the regenerator consisting of the chamber containing refractory material and the boiler, of the tubular water-heater 25, and the pipe 31, passing through the boiler and communicating with the bottom of the generator and with said water-heater, substantially as described.

5. The combination, with the generator, the regenerator, and the boiler, of the water-heaters 22 25, the pipe 19, extending through the boiler and provided with branches communicating, respectively, with the regenerator and the water-heater 22, and the pipe 31, also extending through the boiler, provided with branches communicating, respectively, with the bottom of the generator and with the water-heater 25, substantially as described.

6. The generator 1, provided with the removable hydraulic ring 14, connected with a water-supply reservoir by means of a circulating pipe, 16, the fire space and grate at the base of the generator, the openings 9 above said grate, and the ash-pit and opening 13 below said grate, substantially as described.

7. The combination, with the generators 1 1 and the regenerators 2 2, of the boiler and the water-heaters 22 25, the pipe 31, passing through the boiler and communicating by branches with the bottoms of the generators and with the water-heater 25, and the pipes 19, also passing through the boiler and communicating by branches with the regenerators and with the water-heater 22, substantially as described.

In testimony whereof I have hereunto set my hand in the presence of two subscribing witnesses.

GEORGE SPRING DWIGHT.

Witnesses:
F. VOGELER,
WILLIAM W. MURPHY.